United States Patent [19]

Rusch

[11] 3,931,522

[45] Jan. 6, 1976

[54] PERIOD METER FOR REACTORS

[75] Inventor: Gordon K. Rusch, Downers Grove, Ill.

[73] Assignee: The United States of America as represented by the United States Energy Research and Development Administration, Washington, D.C.

[22] Filed: Sept. 27, 1974

[21] Appl. No.: 509,971

[52] U.S. Cl. ............ 250/390; 176/19 J; 176/19 EC; 250/392
[51] Int. Cl.² .......................................... G01T 3/00
[58] Field of Search .................. 250/390, 391, 392; 176/19 J, 19 EC

[56] References Cited
UNITED STATES PATENTS
3,038,847  6/1962  Hartin ............................. 250/392

Primary Examiner—Harold A. Dixon
Attorney, Agent, or Firm—Dean E. Carlson; Arthur A. Churm; Paul A. Gottlieb

[57] ABSTRACT

An improved log N amplifier type nuclear reactor period meter with reduced probability for noise-induced scrams is provided. With the reactor at low power levels a sampling circuit is provided to determine the reactor period by measuring the finite change in the amplitude of the log N amplifier output signal for a predetermined time period, while at high power levels, differentiation of the log N amplifier output signal provides an additional measure of the reactor period.

5 Claims, 1 Drawing Figure

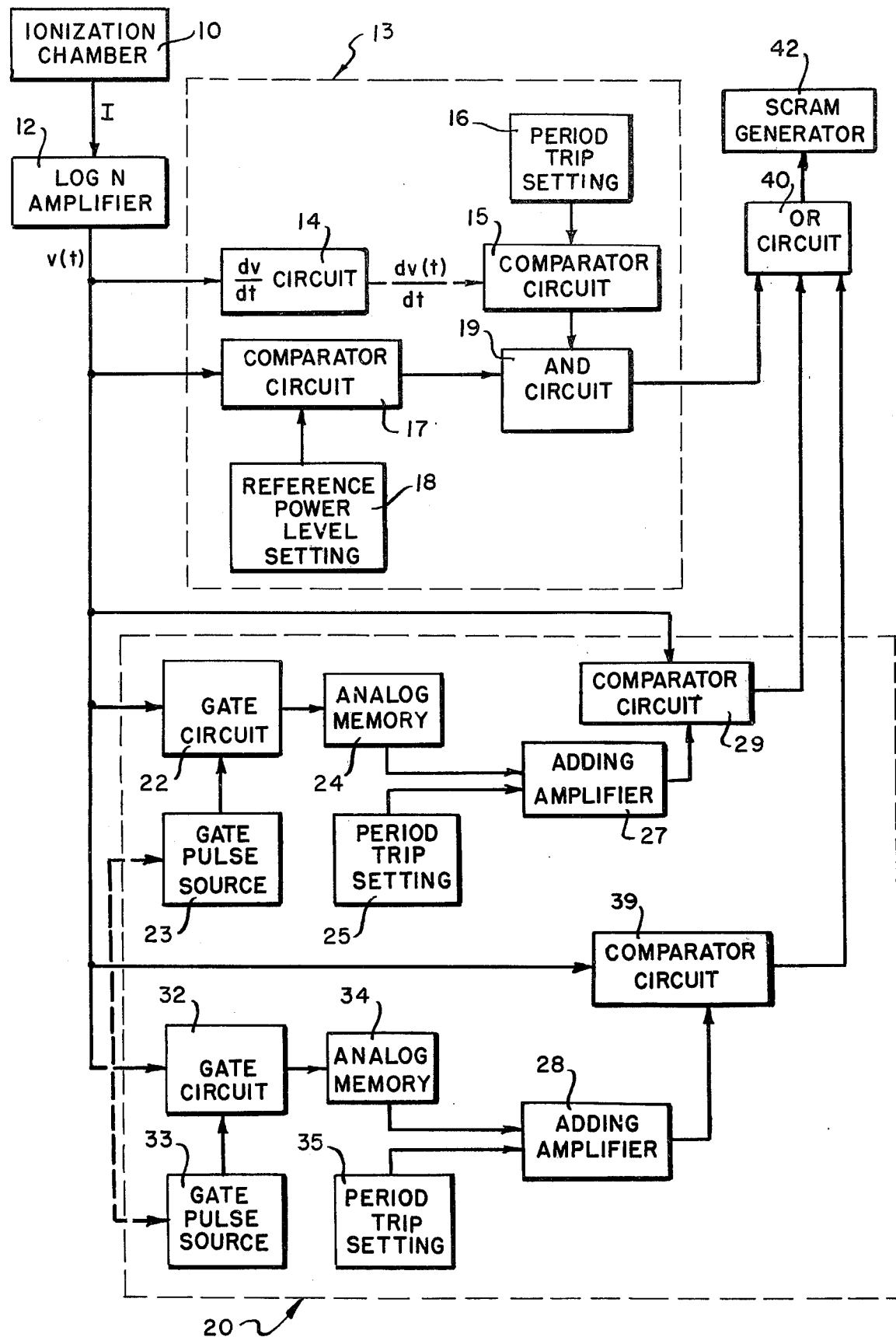

PERIOD METER FOR REACTORS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The reactor period, T, is the time required for the power level of a nuclear reactor to increase by a factor $e$ (the base of natural logarithms). When the reactor period becomes too short, i.e. the power level is increasing too quickly, a reactor scram should be initiated. A log N amplifier type reactor period meter for measuring T includes an ionization chamber whose output current I is a measure of the neutron flux from the reactor and therefore the current I is proportional to the reactor power level. The output of the ionization chamber is applied to a logarithmic or log N amplifier whose output $V(t)$ will be proportional to the log of the reactor power level, i.e.

(1) $V(t) = V_o - (A/A+1)\, \gamma \ln (I/I_o)$ where $V_o$ is the log N amplifier output voltage at some reference time, A is the open loop gain of the amplifier, $\gamma$ is the voltage change across the logarithmic element or equivalent resistance of the log N amplifier due to each factor e increase in current through the logarithmic element, and $I_o$ is the ionization chamber output current at the reference time. The reactor period T can be obtained by differentiating equation (1) with respect to time, (2) $1/T = [dV(t)/dt]/\gamma$ Prior art period meters have applied the $V(t)$ signal to a conventional analog differentiator element to obtain a $dV(t)/dt$ signal representative of reactor period. When the $dV(t)/dt$ signal exceeds a particular value, indicating a low T, a scram signal is generated by a scram generator. It is characteristic of this system to tend to be more vulnerable to electrical and statistical noise when the $V(t)$ signal is small, which corresponds to low reactor power levels. This noise can be of such amplitude as to induce the scram generator to develop a spurious scram signal, causing unnecessary reactor shutdown.

It is therefore an object of this invention to provide an improved reactor period meter.

Another object of this invention is to provide a reactor period meter with reduced probability of spurious reactor scrams.

SUMMARY OF THE INVENTION

An improved log N type nuclear reactor period meter is provided. With the reactor at low power, a sampling circuit which measures finite changes in the $V(t)$ signal over predetermined time intervals is provided, giving $\Delta V/\Delta t$, an arithmetic approximation of the slope of the $V(t)$ signal, which is used to determine the reactor period. With the reactor at high power, conventional analog differentiation of the $V(t)$ signal from a log N amplifier provides the $dV(t)/dt$ reactor period output. With either of the reactor period signals, $dV(t)/dt$ or $\Delta V/\Delta t$, above a predetermined value, a scram signal generator develops a reactor scram signal.

BRIEF DESCRIPTION OF THE DRAWING

The drawing is a block diagram of the improved reactor period meter.

DETAILED DESCRIPTION

Referring to the drawing, there is shown an improved reactor period meter. An ionization chamber 10, such as a neutron sensitive ionization chamber used in the current mode, positioned in the reactor (not shown) develops an output signal I which is proportional to the neutron flux density of the reactor and which is therefore nominally proportional to the reactor power level. The output signal I is fed to a logarithmic amplifier 12 whose output $V(t)$ is of the form of equation (1) as previously described.

To obtain a signal representative of reactor period, it is possible to differentiate $V(t)$ with respect to time, i.e. as shown by equation (2) above. It has been observed that the reactor period output signal developed by applying the $V(t)$ signal to a conventional analog differentiator is very noisy with I at a relatively low value, even though the $V(t)$ signal is well behaved at both high and low signal levels. Thus, the conventional analog differentiator decreases the signal-to-noise ratio at low reactor power levels. Utilization of the well behaved $V(t)$ signal to generate period information at low power will tend to reduce noise-induced scrams.

When the reactor power level is rising on an asymptotic period, the $V(t)$ signal of equation (1) is linear so the reactor period can be obtained by determining the linear slope between any two points along the $V(t)$ signal line on either side of the particular point. This may be done by periodically establishing initial conditions, i.e. $V(0)$ and $t = 0$ and subsequently monitoring the finite changes in the $V(t)$ signal over a predetermined time interval. A period scram level can be established by selecting an allowable increase $\Delta V$ of $V(t)$ over some prescribed time interval $t = \delta$. Since the change in $V(t)$ is the significant parameter because it is related to the increase in reactor power level which will occur before scram action is initiated, the change of its value $\Delta V$ with reference to $V(0)$ is selected first. The value of $\delta$ is then chosen to achieve a scram when the reactor period decreases to some prescribed value $T_t$.

In particular, referring to the drawing there is shown a circuit in which the conventional analog differentiator scram signal is developed by $dV/dt$ scram circuit 13 which is limited to developing scram signals at high power levels and in which low power scram signals are developed by $\Delta V/dt$ circuit 20 which monitors finite changes in the $V(t)$ signal over a predetermined time interval. The high power level scram signal generation is developed by $dV/dt$ scram circuit 13. The $V(t)$ signal developed by amplifier 12 is fed to a conventional differentiator 14 where it is differentiated with respect to time to produce the $dV/dt$ reactor period signal to be utilized at high power. The output of differentiator 14 is applied to comparator circuit 15. A comparator circuit is a logic device which compares the value of a first input signal to that of a second input signal. If it is a "greater than" comparator circuit, it generates a positive logical output signal with the value of the first signal greater than the value of the second and if it is a "lesser than" comparator circuit, it generates a positive logical output signal with the value of the first signal less than the value of the second. In all other cases the output of the circuit is zero. Comparator 15 is a "greater than" circuit intended to determine if the reactor period T is below a predetermined value. Since according to equation (2), T is inversely proportional to $dV/dt$, comparator 15 generates an output having a positive logical state with the $dV/dt$ signal greater than the value of the output of period trip setting 16 which is also applied to comparator circuit 15. A setting circuit, such as period trip setting circuit 16 is an element whose output signal has a predetermined programmable or settable value. The programmed value of period trip setting circuit 16 is the predetermined value of $dV/dt$ at which a scram signal should be generated. Note that while the disclosure herein deal with positive logic circuitry, of course, to those skilled in the art, negative or other types of logic circuitry are equally applicable.

As the positive signal developed by comparator 15 is developed with undesirable frequency at low reactor power due to the noise in the $dV/dt$ signal, means are provided to limit the high reactor power level scramming of the reactor in response to the positive state of comparator 15. The $V(t)$ signal from amplifier 12 is also fed to a "greater than" comparator 17 which compares the value of $V(t)$, which is proportional to reactor power level, to the output of reference power level setting 18. The value of the output of power level setting 18 is programmed to a particular value of $V(t)$ corresponding to a particular power level so that comparator circuit 17 generates an output of positive logical state only when the particular reactor power level is exceeded. The output signals from comparator circuits 15 and 17 are applied to AND circuit 19 which will develop a positive logical output only when both inputs are in a positive logical state simultaneously. Thus, AND circuit 19 will allow the scram signal developed by comparator circuit 15 to be passed on only when comparator circuit 17 is simultaneously indicating that the reactor power level is above a particular value. The particular value of the reactor power level programmed into power level setting 18 is determined by the noise condition of the $dV/dt$ signal from differentiator 14. It has been observed that the range of programmed values for power level setting 18 corresponds with the value of the I signal from ionization chamber 20 typically being between $10^{-7}$ amps and $10^{-4}$ amps. Best results were obtained with the programmed value of the reactor power level setting 18 corresponding to a value of the I signal of $10^{-5}$ amps.

Generation of a reactor scram with reduced noise induced scram is provided by $\Delta V/\Delta t$ circuit 20, which utilizes the $V(t)$ signal, less noisy at low power levels than the $dV/dt$ signal, to monitor changes in the $V(t)$ signal over a predetermined time interval. Low power scram signal detection, i.e. below the reactor power level trip setting of reference power level setting 18 is developed by $\Delta V/\Delta t$ circuit 20. Circuit 20 includes two separate sampling circuits to monitor the finite changes, $\Delta V$, in the value of $V(t)$ over continuously repeated predetermined time intervals of $t = \delta$. The repeated time intervals covered by the two circuits are made to overlap each other so that one sampling circuit is monitoring $V(t)$ for a time period which ends in the middle of the time period monitored by the other circuit. This is done so that there is no dead time while the sampling circuits rezero themselves at the end of each predetermined time period. In all other aspects these two circuits are identical. They each include gate circuits 22 and 32 to which the $V(t)$ signal is fed. Gate circuits 22 and 32 are parts of sample and hold circuits which apply the value of $V(t)$ to analog memories 24 and 34, respectively, whenever they receive a gate pulse from gate pulse sources 23 and 33, respectively.

Gate pulse sources 23 and 33 are devices which continuously generate pulses at predetermined programmable time intervals of $\delta$ and are coupled together so that the timing of their outputs may be synchronized. Thus, every time interval $\delta$, gate circuit 22 is opened and the existing value of $V(t)$ at the instant is stored in analog memory 24 as an updated value of $V(0)$. The same procedure follows for gate circuit 32 and analog memory 34 over an overlapping time interval. Low power period trip settings 25 and 35 develop a programmed output whose value is $\gamma\delta/T_1$, where $\gamma$ is the constant associated with the logarithmic element of log N amplifier 12 as described in equation (1), $T_1$ is the reactor period at which a scram should be generated and $\delta$ is the time interval associated with the reactor period $T_1$ for a given finite change $\Delta V$ in $V(t)$. The output of period trip settings 25 and 35 and of analog memories 24 and 35 are constantly applied to adding amplifiers 27 and 28, respectively, whose outputs will therefore be $V(0) + \gamma\delta/T_1$ with $V(0)$ in each sampling circuit being continually updated each time interval $\delta$. The $V(t)$ signal is applied to comparators 29 and 39, both being "greater than" comparators. Comparators 29 and 39 constantly compare the value of $V(t)$ with the output of adding amplifiers 27 and 37, respectively, and each generates a positive logic state of scram signal with $V(t)$ greater than $V(0) + \gamma\delta/T_1$. Note that the value of the outputs of adding amplifiers 27 and 37 is constantly changed each time interval $\delta$.

The value of $\delta$ is arbitrary being defined by $\delta V$ for a given $T_1$ and vice versa. Of course, the longer $\delta$, the greater the finite change in $V(t)$ from $V(0)$ and the shorter $\delta$ selected the smaller the finite change. For $T_1 \approx 10$ sec, typical values for $\delta$ for acceptable results are within the range of 1–20 sec.

The outputs of comparator circuits 29 and 39 which have low noise induced positive states at low power, and AND circuit 26 19, which is limited to being in the positive state only at high power, all of which are either in a scram or no scram condition are applied to OR circuit 40. If any of comparator circuits 29 and 39 or AND circuit 19 indicate a scram condition, then OR circuit 40 develops an output indicating scram condition and the reactor is scrammed by scram generator 42.

Note that the $\Delta V/\Delta t$ circuit 20 is used over the entire spectrum of reactor power levels while the $dV/dt$ circuit 13 is used only at high power levels. This is done to provide the safety factor of redundancy and increases response time since in certain rare instances at high power the $\Delta V/t$ circuit detects a scram faster than the $dV/dt$ circuit.

Further, it is important to note that the frequency response of the $\Delta V(t)/\Delta t$ system can be significantly improved over the conventional $dV/dt$ system because the signal-to-noise ratio associated with the $\Delta V(t)/\Delta t$ signal is considerably greater than that associated with the $dV/dt$ signal developed by a conventional differentiator. Also, the power level increase factor as well as the transient response may be adjusted to minimize the effects of noise or to otherwise optimize the $V(t)$ circuit performance. This is an additional parameter to govern the performance of the circuit not otherwise available in the conventional analog differentiator circuit.

The embodiments of the invention in which an exclusive property or privilege is claimed are defined as follows:

1. In a device for developing a reactor scram signal in response to a reactor period T less than a specific value, the device including means for measuring the neutron flux density of the reactor and developing a first output signal which is a function of the neutron flux density, a differentiator coupled to the means for measuring for diffentiating the first output signal to develop a second output signal and a first comparator coupled to the differentiator and being responsive to the second output signal greater than a particular value to develop a first alarm signal, an apparatus for reducing noise induced scrams comprising:

a second comparator coupled to the first comparator and the means for measuring and being responsive to first output signal greater than a predetermined value and coincidentally the first alarm signal to develop a second alarm signal, a first gate circuit coupled to the means for measuring, a first signal storage circuit coupled to said first gate circuit, a timing circuit for developing periodically a first timing signal coupled to said first gate circuit, said first gate circuit being responsive to said first timing signal to couple the first output signal to said first signal storage circuit, said first signal storage circuit acting to continuously develop a third output signal equal to the first output signal at the instant said first output signal is coupled to said first storage circuit plus a particular quantity with said third output signal being updated each time said first output signal is coupled to said first signal storage circuit in response to said first timing signal, a third comparator coupled to the means for measuring and said first signal storage circuit and being responsive to the first output signal greater than said third output signal to develop a third alarm signal, and an OR gate coupled to said second and third comparators and being responsive to an alarm signal developed thereby to develop a reactor scram signal.

2. The device of claim 1 wherein said means for measuring includes means for developing an I signal whose value is proportional to the neutron flux density of the reactor, and a log N amplifier responsive to said I signal to develop the first output signal proportional to the natural log of said I signal, said first timing circuit developing said first timing signal periodically every time interval $t$, said particular quantity being equal to $t\gamma/T$ where $\gamma$ is a constant associated with said log N amplifier.

3. The device of claim 2 wherein said means for developing an I signal is a neutron sensitive ionization chamber used in the current mode and wherein said predetermined value to which said first output signal is compared by said second comparator corresponds to the value of said I signal being between the range of $10^{-7}$ and $10^{-4}$ amps.

4. The device of claim 3 wherein said predetermined value corresponds to the value of said I signal being about $10^{-5}$ amps.

5. The device of claim 1 further including a second gate circuit coupled to the means for measuring and said timing circuit, a second signal storage circuit coupled to said second gate circuit, said timing circuit further developing periodically a second timing signal in the intervals between each of said first timing signals, said second gate circuit being responsive to said second timing signals to couple the first output signal to said second signal storage circuit, said second signal storage circuit acting to continuously develop a fourth output signal equal to the first output signal at the instant said first output signal is coupled to said second storage circuit plus said particular quantity with said fourth output signal being updated each time said first output signal is coupled to said second signal storage circuit in response to said second timing signal, and a fourth comparator coupled to the means for measuring and said second storage circuit and being responsive to the first output signal greater than said fourth output signal to develop a fourth alarm signal, said OR gate being coupled to said fourth comparator and being responsive to said fourth alarm signal to develop said reactor scram signal.

* * * * *